F. J. DOUL.
WATER METER INSTALLATION.
APPLICATION FILED MAY 12, 1917.
1,267,389.
Patented May 28, 1918.
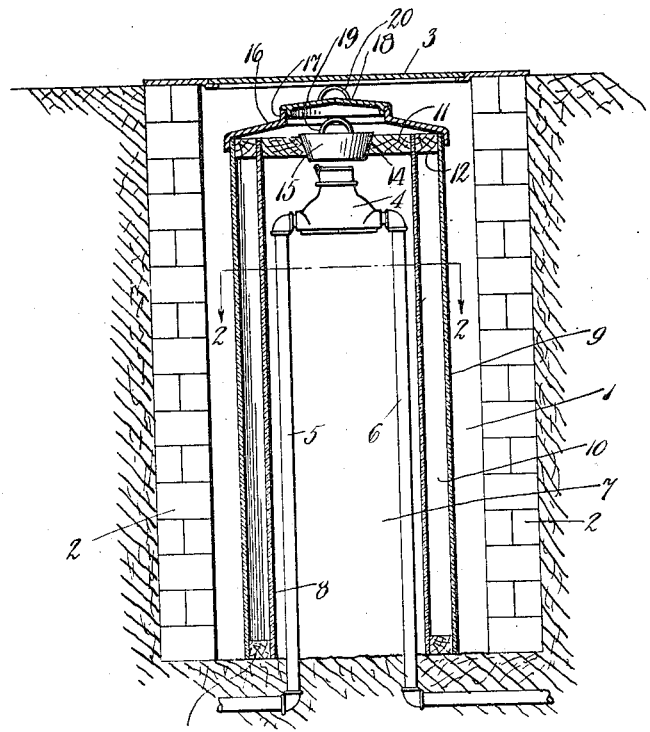
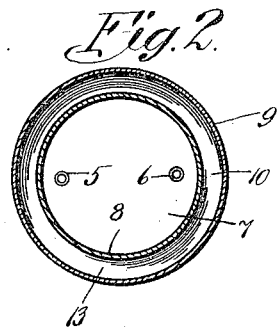
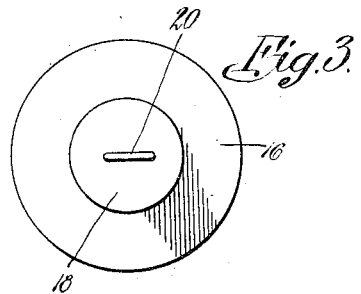
F. J. Doul — Inventor
BY E. J. Bond.
HIS ATTORNEY.

UNITED STATES PATENT OFFICE.

FRANK J. DOUL, OF GREEN BAY, WISCONSIN.

WATER-METER INSTALLATION.

1,267,389.

Specification of Letters Patent.     Patented May 28, 1918.

Application filed May 12, 1917. Serial No. 168,250.

*To all whom it may concern:*

Be it known that I, FRANK J. DOUL, a citizen of the United States of America, residing at Green Bay, in the county of Brown and State of Wisconsin, have invented certain new and useful Improvements in Water-Meter Installations, of which the following is a specification, reference being had therein to the accompanying drawing.

The invention relates to improvements in water meter installations, and more particularly to the provision of means for preventing freezing of the meter.

The principal object of the invention is the provision of a chamber which is adapted to receive the water meter, whereby the latter remains in operative condition irrespective of changes in temperature.

A further object aims at the arrangement of a dead air space which, surrounding the chamber, effectively resists low temperature.

Another object aims at the construction of a chamber which will permit heat radiating from the earth below the frost line to enter the interior of the chamber and thus contribute to maintain the meter in operative condition.

With these and other objects in view that will become apparent as the description proceeds, the invention consists in the features of construction, combination and arrangement of parts herein fully described and claimed, reference being had to the accompanying drawing, in which—

Figure 1 is a sectional side view of the ordinary water meter vault, to which the invention has been applied.

Fig. 2 is a horizontal section on the line 2—2 of Fig. 1, and

Fig. 3 is a top plan view of the device.

Referring to the drawing, 1 designates a vault, the walls 2 of which are made of bricks, tiling, or the like, and a cover 3 forms a closure for the upper open end of the wall, which cover may be removed, or placed in normal position, with comparative ease and convenience. The water meter 4 is properly supported in the vault by means not indicated, and is connected to an inlet pipe 5 and an outlet pipe 6, as will be readily understood by those versed in the art.

Intermediate the water meter and the walls 2 of the vault, a chamber 7 is provided which is defined by the provision of a cylinder 8 arranged intermediate the water meter 4 and the walls 2, and is preferably, although not necessarily, provided in concentric relation to the water meter. In spaced relation to the cylinder 8, and concentric thereto, another cylinder 9 is provided, so that between the cylinders 8 and 9 an annular space 10 is obtained, which enables the provision of a dead air space, so as to exclude any influences due to changes in temperature. The cylinders 8 and 9 are preferably made of heavy tarred paper, or any other frost resisting material, whereby the operative condition of the meter, irrespective of temperature conditions, is insured.

The inner cylinder 8 is closed at its upper end by a wooden cover 11, and the annular chamber or space 10 is sealed at its upper and lower end by wooden rings 12 and 13, provided at the top and bottom, respectively, of the cylinders. Attention is called to the fact that the lower end of the inner cylinder 8 is open and directly in communication with the earth, whereby heat radiating from the earth below the frost line is free to enter the interior chamber 7, and thus aid in maintaining the water meter 4 in operative condition. The wooden cover 11 is formed with a central tapering opening 14, to receive a plug 15, so that inspection of the water meter may be made without necessitating the removal of the cover 11, but simply by removing the plug 15, which subsequently may be placed in closed position. The outer cylinder 9 is closed by a casting 16, which tapers upwardly and is formed with a neck 17, to receive a cover 18. The plug 15 and the cover 18 are provided with handles 19 and 20, respectively, whereby manipulation of the plug and cover is facilitated.

The manner of reading the meter will be understood from the foregoing description, it being only necessary to remove cover 3, lifting of cover 18 and removal of plug 15. After the reading has been taken, the various parts are placed in proper position.

The arrangement of the chamber 7, with its lower open end, is of special value inasmuch as heat is constantly radiated from the earth below the frost line, and thus radiation of heat in conjunction with the dead air space maintained around the meter and the three-fold covering obtained by the arrangement of the plug 15 and covers 18 and 3, will insure operative condition of the meter even at very low temperatures.

While the drawing illustrates the preferred embodiment of the invention, I am aware, of course, that various changes and modifications may be made without departing from the spirit of my invention. It is, therefore, not my intention to limit myself strictly to the details as shown in the drawing, but rather to avail myself of any changes or modifications constituting departures within the scope of my invention, as indicated in the appended claim.

I claim:

In combination with a vault containing a water meter, a plurality of concentric cylinders arranged intermediate the wall of the vault and the meter, the annular chamber between said cylinders being closed at the bottom and top to provide an insulating layer of dead air, a cover for the top of said inner cylinder, and means in said cover to permit inspection of said meter.

In testimony whereof I hereunto affix my signature.

FRANK J. DOUL.

Copies of this patent may be obtained for five cents each, by addressing the "Commissioner of Patents, Washington, D. C."